H. W. CHENEY.
TIME LIMIT DEVICE FOR CONTROLLERS.
APPLICATION FILED SEPT. 29, 1906.

931,994.

Patented Aug. 24, 1909.

Witnesses
Oliver W. Sharman
Fred J. Kinsey

Inventor
Herbert W. Cheney
By
Chas. E. Lord
Attorney

UNITED STATES PATENT OFFICE.

HERBERT W. CHENEY, OF NORWOOD, OHIO, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO.

TIME-LIMIT DEVICE FOR CONTROLLERS.

931,994.         Specification of Letters Patent.     Patented Aug. 24, 1909.

Application filed September 29, 1906. Serial No. 336,758.

*To all whom it may concern:*

Be it known that I, HERBERT W. CHENEY, citizen of the United States, residing at Norwood, in the county of Hamilton and State of Ohio, have invented certain new and useful Improvements in Time-Limit Devices for Controllers, of which the following is a full, clear, and exact specification.

My invention relates to protective devices for electric circuits and especially to overload protective devices for electric motors.

In operating any kind of electrical apparatus, some protective device must be used to prevent accidents due to too great a flow of current. Some kinds of electrical apparatus, however, require a larger current at starting than during their normal operation, and often with such apparatus the starting current is so great that if long continued there would be disastrous results. This would happen, in many cases, with electric motors. But the ordinary protective device is operative at only one current strength, and therefore, if it allows the large starting current it does not fully protect during normal running, while it cannot be adjusted to respond to what is an excessive current during normal running without operating undesirably at starting.

It is one object of my invention to produce a device which will fully protect during normal running conditions while also allowing the temporary overload at starting.

Other objects of my invention will appear hereinafter.

In one aspect my invention comprises a protective device for electric circuits, the sensitiveness of which is varied a predetermined time after the circuit is closed.

In a more specific aspect my invention comprises the combination with a translating device and a starting controller therefor, of protective means that are operative under predetermined values of energy supplied to said translating device when the controller is first moved to "starting" position and that are operative under different values of energy after a predetermined time thereafter.

In still another aspect my invention comprises the combination with a dynamo-electric machine and a controller therefor, of a circuit-breaker having a plurality of actuating coils, one of which is operative only after the circuit has been closed by the controller for a predetermined time.

Other aspects of my invention will appear from the description and drawings and will be particularly pointed out in the claims.

Figure 1:
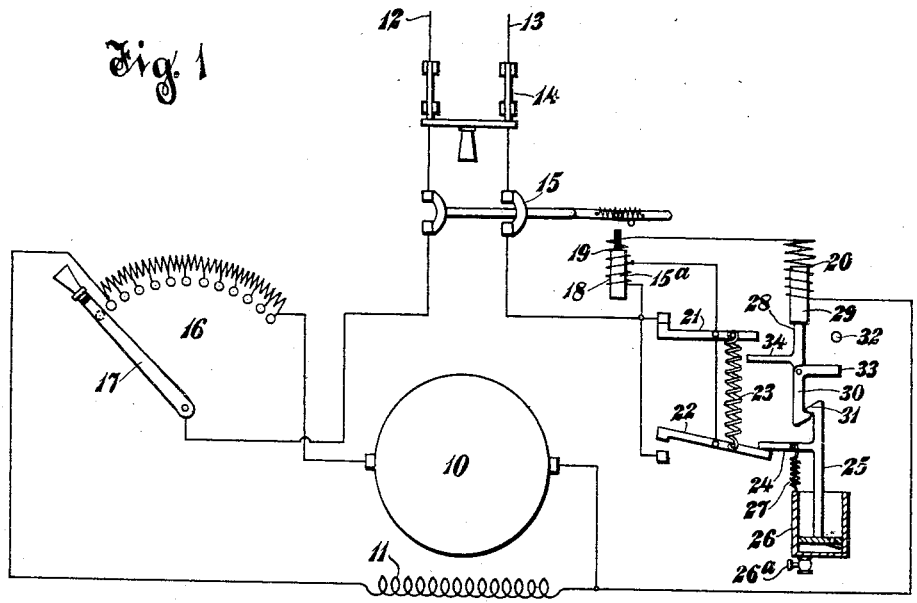
Figure 2:
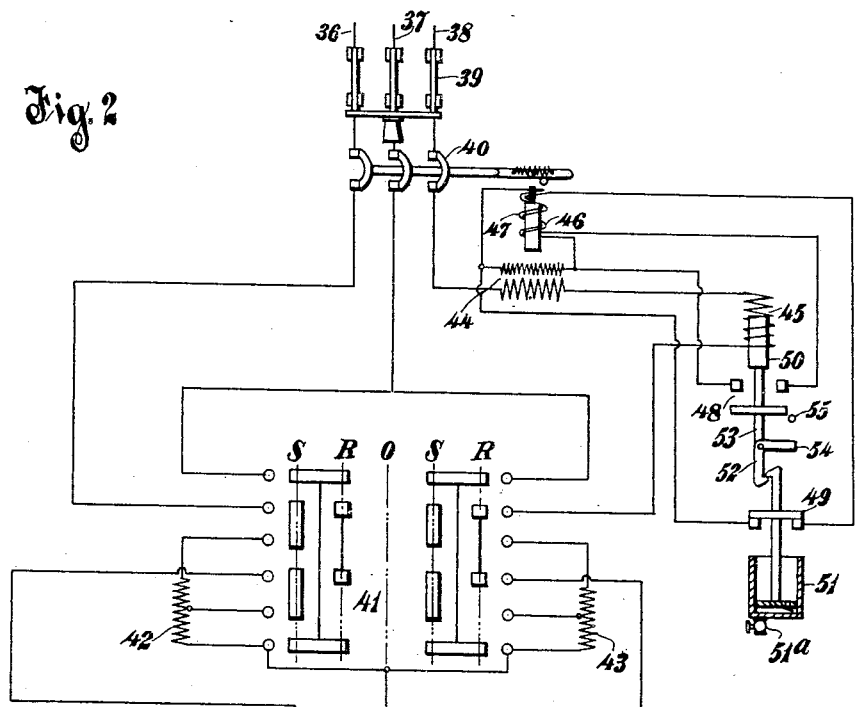

Figure 1 shows one embodiment of my invention as applied to a direct current motor; and Fig. 2 shows another embodiment of my invention as applied to an alternating current motor.

In Fig. 1 the armature 10 and field 11 of an electric motor are supplied with current from the mains 12 and 13 through a manually operated main switch 14, an overload circuit-breaker 15, and a starting box 16. The starting box is shown with its handle 17 in its extreme left or "off" position from which it can be moved toward the right to close the motor circuits and to decrease the resistance in the motor armature circuit. This starting box of itself forms no part of my present invention and may be of any desired form. The motor current also passes through the actuating coils 18 and 19 of the circuit-breaker, and the solenoid coil 20. The two coils 18 and 19 are shown wound one above the other about the same core $15^a$. In practice, however, either of these conditions is necessary; in fact, it might be desirable to have the coils 18 and 19 wound about different cores, or if wound about the same core, so interwound that each would act in the same manner upon the entire core as in Fig. 2. The coil 18 may be short-circuited by either of two switches 21 and 22 while the coil 19 is always in circuit. The switches 21 and 22 are biased toward closed position as by a spring 23 or otherwise. The switch 21 is normally closed while the switch 22 is normally held open by an arm 24 projecting from the piston rod 25 of dash-pot 26. This dash-pot is arranged to allow a free upward movement of its piston but to retard the downward movement thereof. The piston of the dash-pot is biased toward its lowest position by means of gravity or a spring 27 or both. The downward extension 28 of the core 29 of the solenoid 20 has attached to it a latch 30 engaging a finger 31 on the upper end of the dash-pot piston but arranged to be released therefrom by means of a pin 32 acting on the lateral arm 33 of the latch when the solenoid core 29 reaches its uppermost position. An arm 34 extends sidewise from the downward extension 28 and is arranged to engage with and open the switch 21 when the core 29 is moved upward.

The operation of the system of Fig. 1 is as follows:—The switch 14 and circuit-breaker 15 being closed, the motor circuit is completed by moving the arm 17 from its extreme left position toward the right. When it reaches the button next to the one upon which it is shown, the motor circuits are completed, the field circuit without any external resistance and the armature with the full resistance of the starting box in series with it. The coils 19 and 20 are also energized at this time, the coil 18 being short-circuited by the switch 21, so that the circuit-breaker will allow the heavy current necessary for starting, but will still trip in case a current heavier than the required starting current should flow. The coil 20 being energized the core 29 is moved upward and in its upward movement first allows the switch 22 to close by raising arm 24, then opens switch 21 by means of the arm 34 and finally, through the engagement of arm 33 and pin 32, releases the finger 31 from the latch 30 and allows the piston rod 25 to descend slowly under the influence of the spring 27. After a predetermined time for which the dash-pot may be adjusted as by a stop-cock 26ª, the arm 24 reëngages the switch 22 and re-opens it, whereupon the short-circuit around the coil 18 is broken, and said coil is energized to increase the sensitiveness of the circuit-breaker. The circuit-breaker may be of any desired form and is here shown as of the toggle type. Should the current rise beyond a predetermined value while either of the switches 21 and 22 is closed, the core 15ª of the circuit-breaker is raised by coil 19 to trip the circuit-breaker, while if the current rises beyond a smaller predetermined value after the switches 21 and 22 have both been opened, the coils 18 and 19 together raise the core 15ª to trip the circuit-breaker. The switch 21 is generally necessary because without it the circuit-breaker might be tripped by the two coils 18 and 19 upon closing the circuit before the switch 22 could close.

In Fig. 2 I have shown my invention applied to a potential starter for induction motors. The induction motor 35 is supplied from the mains 36, 37 and 38 through the manual switch 39, the circuit-breaker 40, and the potential starter 41. This potential starter may be of any preferred type having any desired number of positions, but is here shown as one having "off" and "running" positions O and R respectively, with a single "starting" position S between them. The potential starter has sets of fixed and movable contacts which in the "starting" position connect the transformer windings 42 and 43 in open delta to the mains and the respective terminals of the motor to intermediate points on the transformer windings 42 and 43 and the common terminal of the two windings, and in the "running" position disconnect the transformer windings 42 and 43 and connect the motor terminals directly to the mains. In one of the mains, as 38, on that side of the circuit-breaker toward the motor, are a solenoid 45 and the primary of a transformer 44. The secondary of the transformer 44 supplies the two actuating coils 46 and 47 of the circuit-breaker 40 in parallel, the circuit of coil 47 being always complete while the circuit of coil 46 is only complete when the switches 48 and 49 are both closed. These switches are controlled by the core 50 of the solenoid 45, the switch 49 being normally (i. e., when the circuit is open) closed and the switch 48 normally open as shown. A dash-pot 51 retards the downward or closing movement of the switch 49 while allowing a free upward movement thereof. The piston rod of the dash-pot 51 is attached, as by a latch 52, to the downward extension 53 from the core 50 and is tripped to release the dash-pot piston rod when the core 50, upon reaching its upper limit of movement, causes the lateral extension 54 of the latch 52 to engage with the pin 55.

The operation of the system is as follows: The switch 39 and circuit-breaker 40 being closed the motor circuit is completed when the controller 41 is moved into its starting position S. This also completes the circuit of the primary of transformer 44 and of the solenoid 45. The secondary of transformer 44 supplies the coil 47 to protect the motor from an excessive starting current while permitting the starting current to be larger than the normal running current. The circuit of coil 46 is open. The solenoid 45 raises its core 50 quickly and in so doing first opens the switch 49, then closes the switch 48, and finally releases the latch 52 to allow the switch 49 to descend and reassume its closed position. This downward movement of the switch 49, however, is retarded by the dash-pot 51. After a predetermined time, for which the dash-pot may be adjusted, as by the stop-cock 51ª, the switch 49 is again closed, thus completing the circuit of the coil 46 to make the circuit-breaker more sensitive. The circuit-breaker will now trip with less current than before the switches 48 and 49 were both closed.

For simplicity the tripping coils and allied parts of the circuit-breaker are shown in Fig. 2 in only one leg of the three-phase circuit. But it is obvious that by placing such tripping coils in two legs of the circuit more complete protection would be secured. In practice this would be done, but it has not been deemed necessary to illustrate it here.

The exactness of adjustment of the time after which the sensitiveness of the protective device is varied will depend upon the conditions under which the device is intended to operate. The term "a predetermined time" as used in the specification and claims is intended to cover a time which is predetermined with such reasonable exactness as may be required by the conditions of operation.

My invention is applicable to other forms of translating devices than electric motors, and is not limited to electromagnetic circuit-breakers. Many modifications in the precise arrangements here shown and described may also be made without departing from the spirit and scope of my invention and in the following claims I aim to cover my invention broadly.

What I claim as new is:—

1. A protective device for electric circuits, the sensitiveness of which is varied a predetermined time after the circuit is closed.

2. In combination, an overload protective device for electric circuits, and means for increasing the sensitiveness of said device a predetermined time after the circuit is closed.

3. A current-responsive protective device for electric circuits, the ampere-point of operation of which is altered a predetermined time after the circuit is closed.

4. An overload protective device for electric circuits, in combination with automatic means for altering the strength of current required for the operation of such device a predetermined time after the circuit is closed.

5. In combination, an electromagnetic circuit-breaker, and means for rendering inoperative a portion of the actuating coil thereof for a predetermined time after the circuit is closed.

6. In combination, an electromagnetic circuit-breaker, and means for rendering operative an actuating coil thereof a predetermined time after the circuit is closed.

7. A current-responsive electromagnetic circuit-breaker, the ampere-point of operation of which is lowered a predetermined time after the circuit is closed.

8. A current-responsive electromagnetic circuit-breaker, in combination with means for varying the strength of current required to operate said circuit-breaker a predetermined time after the circuit is closed.

9. In combination, a controlling switch for electric motors, and a protective device the sensitiveness of which is varied a predetermined time after the controlling switch is moved to close the circuit.

10. In combination, a controlling switch, an overload protective device, and means for varying the strength of current required to operate said protective device a predetermined time after the controlling switch is moved into "starting" position.

11. In combination, an electromagnetic circuit-breaker, a controlling switch, and means for rendering inoperative a portion of the actuating coil of the circuit-breaker for a predetermined time after the controlling switch is moved into "starting" position.

12. In combination, an electromagnetic circuit-breaker and a controlling switch, an actuating coil of said circuit-breaker being arranged to be rendered operative a predetermined time after the controlling switch is moved out of "off" position.

13. In combination, a controlling switch, an overload protective device, and means for altering the ampere-point of operation of said protective device a predetermined time after the controlling switch is moved out of "off" position independent of further movement of said switch.

14. In combination, an electric motor, a starting switch and an overload protective device therefor, and means for varying the sensitiveness of said protective device a predetermined time after the starting switch is moved into "starting" position.

15. In combination, a motor, a starting controller and an overload protective device therefor, and means for lowering the ampere-point of operation of said protective device a predetermined time after the controller is moved out of "off" position.

16. The combination with an electric motor and a controller therefor, of protective means that are operative at certain predetermined current values for a predetermined time after the controller has been moved to "starting" position, and at certain other predetermined values after such time has expired.

17. The combination with a translating device and a controller therefor, of an electromagnetic circuit-breaker, a coil of which is operative to trip the circuit-breaker only after a predetermined time has elapsed after the controller has been moved to close the circuit.

18. The combination with a dynamo-electric machine and a controller therefor, of a circuit-breaker having a plurality of actuating coils, one of which is operative only after the circuit has been closed by the controller for a predetermined time.

19. An electromagnetic circuit-breaker having a plurality of coils, one of which is rendered operative a predetermined time after the remainder.

20. An electromagnetic circuit-breaker having a plurality of coils, one of which is rendered operative a predetermined time before the remainder.

21. An electromagnetic circuit-breaker having two actuating coils, one of which is automatically rendered operative a predetermined time after the other.

22. The combination with a translating device and a starting controller therefor, of protective means that are operative under predetermined values of energy supplied to said translating device when the controller is first moved to a starting position and that are operative under different values of energy after a predetermined time thereafter.

23. In combination, an electro-magnetic circuit-breaker having a plurality of overload tripping coils, a circuit in which the current varies in proportion to the current carried by the circuit-breaker, said tripping coils being connected in different branches of said circuit, and means for energizing said coils successively.

24. In combination, an electro-magnetic circuit-breaker having a plurality of overload tripping coils, a circuit carrying a current proportional to that through the circuit-breaker, said tripping coils being connected in different branches of said circuit, and means for preventing one of said coils from being energized until some time after the circuit through the circuit-breaker has been completed.

In testimony whereof I affix my signature, in the presence of two witnesses.

HERBERT W. CHENEY.

Witnesses:
   GEO. B. SCHLEY,
   FRED J. KINSEY.

---

Correction in Letters Patent No. 931,994.

It is hereby certified that in Letters Patent No. 931,994, granted August 24, 1909, upon the application of Herbert W. Cheney, of Norwood, Ohio, for an improvement in "Time-Limit Devices for Controllers," an error appears in the printed specification requiring correction as follows: Page 1, line 81, the word "either" should read *neither;* and that the said Letters Patent should be read with this correction therein that the same may conform to the record of the case in the Patent Office.

Signed and sealed this 19th day of October, A. D., 1909.

[SEAL.]
                        C. C. BILLINGS,

*Acting Commissioner of Patents.*